United States Patent
Dubosc (10) Patent No.: US 10,000,151 B2
(45) Date of Patent: Jun. 19, 2018

(54) MOTOR VEHICLE LIGHTING DEVICE

(71) Applicant: Valeo Vision, Bobigny (FR)

(72) Inventor: Christophe Dubosc, Villemomble (FR)

(73) Assignee: VALEO VISION, Bobigny (FR)

( * ) Notice: Subject to any disclaimer, the term of this patent is extended or adjusted under 35 U.S.C. 154(b) by 0 days. days.

(21) Appl. No.: 15/045,439

(22) Filed: Feb. 17, 2016

(65) Prior Publication Data

US 2016/0245475 A1 Aug. 25, 2016

(30) Foreign Application Priority Data

Feb. 19, 2015 (FR) ...................... 15 51437

(51) Int. Cl.
| | |
|---|---|
| *B60Q 3/74* | (2017.01) |
| *B60Q 1/00* | (2006.01) |
| *B60Q 1/26* | (2006.01) |
| *B60Q 1/30* | (2006.01) |
| *F21S 8/10* | (2006.01) |
| *B60Q 3/64* | (2017.01) |

(52) U.S. Cl.
CPC ............. *B60Q 3/74* (2017.02); *B60Q 1/0035* (2013.01); *B60Q 1/26* (2013.01); *B60Q 1/2607* (2013.01); *B60Q 1/30* (2013.01); *B60Q 3/64* (2017.02); *F21S 48/215* (2013.01); *F21S 48/2212* (2013.01); *F21S 48/232* (2013.01); *F21S 48/238* (2013.01); *F21S 48/24* (2013.01); *B60Q 2400/20* (2013.01)

(58) Field of Classification Search
USPC ........................................................ 362/509
See application file for complete search history.

(56) References Cited

U.S. PATENT DOCUMENTS

| | | | |
|---|---|---|---|
| 8,833,988 B2 | 9/2014 | Larsson | |
| 2009/0154186 A1* | 6/2009 | Natsume | .............. B60Q 1/0041 |
| | | | 362/516 |
| 2010/0053986 A1* | 3/2010 | Ishikawa | .............. B60Q 1/2665 |
| | | | 362/509 |
| 2010/0080010 A1 | 4/2010 | Marui et al. | |
| 2011/0170304 A1* | 7/2011 | Fujita | ................... G02B 6/0008 |
| | | | 362/501 |
| 2012/0262933 A1 | 10/2012 | Larsson | |
| 2012/0262937 A1* | 10/2012 | Hayashi | ................... B60Q 3/64 |
| | | | 362/520 |

(Continued)

FOREIGN PATENT DOCUMENTS

| | | |
|---|---|---|
| EP | 1191280 | 3/2002 |
| EP | 1191280 A1 | 3/2002 |

(Continued)

*Primary Examiner* — Michael G Lee
*Assistant Examiner* — David Tardif
(74) *Attorney, Agent, or Firm* — Oblon, McClelland, Maier & Neustadt, L.L.P.

(57) ABSTRACT

A lighting device for a motor vehicle. The device comprises
  a wall comprising at least one protuberance and
  at least one first light source situated inside the protuberance.
The wall comprises a reflecting zone having light reflection properties, and formed facing the first light source, such that the first light source is able to generate a light beam passing through the wall, that is propagated outside the lighting device before being reflected on the reflecting zone of the wall to generate an apparent lighting from the wall.

14 Claims, 8 Drawing Sheets

(56) References Cited

U.S. PATENT DOCUMENTS

| | | |
|---|---|---|
| 2013/0003404 A1 | 1/2013 | Hayashi |
| 2013/0182450 A1* | 7/2013 | Buisson ................... B60J 5/107 362/496 |
| 2016/0010826 A1* | 1/2016 | Tsukatani .............. F21S 48/215 362/510 |

FOREIGN PATENT DOCUMENTS

| | | |
|---|---|---|
| EP | 2511136 | 10/2012 |
| EP | 2511136 A1 | 10/2012 |
| FR | 2913710 | 9/2008 |
| FR | 2913710 A1 | 9/2008 |
| FR | 2994548 | 2/2014 |
| FR | 2994548 A1 | 2/2014 |
| JP | H0986273 | 3/1997 |

\* cited by examiner

MOTOR VEHICLE LIGHTING DEVICE

CROSS-REFERENCE TO RELATED APPLICATIONS

This application claims priority to the French application 1551437 filed Feb. 19, 2015, which application is incorporated herein by reference and made a part hereof.

BACKGROUND OF THE INVENTION

1. Field of the Invention

The present invention belongs to the field of vehicle lighting. It relates in particular to a lighting device, in which an apparent lighting is generated from a reflecting outside wall.

The invention is particularly advantageous when it is incorporated in lights of a motor vehicle, notably signaling lights.

2. Description of the Related Art

"Signaling light" of a vehicle should be understood to mean a lighting device having a main signaling function for the vehicle with respect to other vehicles, pedestrians, animals, etc.

"Motor vehicle" should be understood to mean any type of wheeled vehicle able to move by its own means such as a passenger car, a heavy truck, a motorcycle, a tractor, a utility vehicle, etc. The lights of a motor vehicle usually comprise a casing in which is arranged a light source. This light source generates light beams which are propagated in the casing then pass for example through a transparent protective lens intended to protect the light source situated in the casing.

A reduced compactness and a restricted cost are imposed in the design of the light devices. In particular, the casing needs to be able to be easily embedded in the body work of the car. This has the notable consequence of reducing the extent of the light emission surface of the lights. For a light, these emission surfaces thus rarely exceed 20 cm by 10 cm, in the horizontal direction or in the vertical direction.

Furthermore, the designers of lighting devices now have to demonstrate a wealth of ingenuity to propose certain exclusive decorative aspects to major motor vehicle constructors. The conventional lights mentioned above limit the creation of decorations to the casing or to the protective lens.

For example, the document EP1191280 notably describes a signaling device for a motor vehicle in which a decorative element is made visible by different reflections occurring within the casing. In this document, the decorative element is limited to the protective lens and to the casing.

Moreover, current regulations dictate dimensions and light intensities that are often incompatible with excessively large decorative elements except by increasing the overall size of the lighting device. As is mentioned above, such an overall increase in the dimensions of the device cannot be considered because of the constraints linked to compactness and cost.

The possibilities in terms of extent of the light emission surface and of creation of decorative devices for the current lights are therefore limited by the technical solutions currently proposed for these conventional lights.

SUMMARY OF THE INVENTION

The present invention improves the situation.

To this end, a first aspect of the invention relates to a lighting device for a motor vehicle, wherein it comprises:

a wall comprising at least one protuberance; and
at least one first light source situated inside the protuberance;

and in that the wall comprises a reflecting zone having light reflection properties, and formed facing the first light source, such that the first light source is able to generate a light beam passing through the wall that is propagated outside the lighting device before being reflected on the reflecting zone of the wall to generate an apparent lighting from the wall.

A "reflecting" material should be understood to mean a material having reflection properties of diffuse and/or specular type.

"Light beam being reflected on the reflecting zone" should be understood to mean a reflection of the light beam on the wall toward the outside relative to the lighting device. As is explained herein below, the wall in the reflecting zone can be a double wall in which an outer wall is translucent and protects an inner wall which has, at least on one side, light reflection properties.

An apparent lighting is generated by reflection on the wall of the lighting device toward the outside. This apparent lighting is not necessarily limited by the constraints of compactness and of cost usually present for conventional lights.

The wall of the lighting device takes the form of a single part of which certain parts have different optical properties. The costs associated with the production and the installation of such a light device can be reduced relative to a conventional device for which it is necessary to provide a sometimes complex assembly of the different parts (light source, protective lens, casing, etc.) forming the light device.

The surface on which the light beam is reflected can extend over a relatively large zone. The light beams are in effect here reflected outside of the lighting device (on the reflecting zone of the wall). The extent of the light emission surface is no longer necessarily reduced to the dimensions of the casing to be embedded in the body work of the vehicle.

For example, on a utility vehicle, it is possible to provide the protuberance at the top level of the rear face of the vehicle (close to the roof) and the wall being extended over the rear face with, for example, the reflecting zone extending over all the rear face of the utility vehicle.

In one embodiment, the reflecting zone has a reflection rate of at least 30%. Thus, the light beams generated by the first light source are sufficiently reflected to be correctly visible from the outside of the vehicle.

In another embodiment, the protuberance comprises a first light output surface formed facing the reflecting zone for a light beam generated by the first light source to be reflected on the reflecting zone. Thus, the protuberance protects the first light source but, by virtue of the light output surface formed in this protuberance, allows the light beams generated by the first light source to pass.

"Protuberance comprising a light output surface" should be understood to mean any protuberance for which the wall of the protuberance has at least one zone able to allow a light beam generated by a light source situated inside the protuberance to pass.

In one embodiment, the protuberance further comprises a second light output surface formed for a light beam generated by the first light source and/or an auxiliary light source situated in the protuberance to be propagated directly toward the outside space without being reflected on the reflecting zone. The use of the protuberance is thus optimized because it simultaneously protects the first light source and/or the auxiliary light source.

In particular, the first light output surface and/or the second light output surface can comprise a material having light transmission properties. This material here has the dual function of protection of the light source and of transmission of the light beams generated by the first light source.

"Light output surface ( . . . ) comprises a material" should be understood to mean that the material fills the light output surface, at the level of the wall between the space external to the device and the space internal to the device.

In another embodiment, the wall delimits a space internal to the lighting device and a space external to the lighting device. The lighting device can then further comprise at least one second light source situated in the internal space, in the reflecting zone having light reflection properties. In this embodiment, the reflecting zone having light reflection properties also has transmission properties such that a light beam generated by the second light source can pass through the wall at least in the part of the reflecting zone.

The wall, in the part of the reflecting zone mentioned above, then has light reflection and transmission properties. The possibilities of decorative effects made possible by such technical features are very numerous.

Furthermore, the optical effects made possible by the combination of the reflection and transmission allow for a limitation on the number of components used to make the lights of a vehicle. In effect, it is for example possible, typically for an interior lighting of the vehicle, to adjust mixtures of colors between the reflected light beams and the transmitted light beams in order to avoid having to provide one light source per color. Variations of colors, variations of light intensity or of appearance more or less diffusing or specular can be produced. For an outside lighting, it is also, for example, possible to juxtapose a stop function by external reflection on the reflecting zone with a position light function produced by transmission through the reflecting zone.

In one embodiment, the part of the reflecting zone also having light transmission properties has a transmission rate of at least 30%.

In another embodiment, the first and/or the second light source comprises at least one light-emitting diode. The properties of compactness and of intensity of the light emitted by a light-emitting diode improve the bulk and the effectiveness of the device.

In one embodiment, the wall is manufactured by injection molding. The manufacturing of the lighting device is thus greatly simplified and the costs associated with such manufacture are reduced.

A second aspect of the invention relates to a signaling light for a motor vehicle, the light being formed by the lighting device described above.

In one embodiment of the second aspect of the invention, the light is situated on the rear face of the vehicle, the motor vehicle comprising a rear door. The rear door then comprises a door reflecting zone having light reflection properties and formed facing the first and/or second light source, such that the first and/or second light source is able to generate a light beam that is reflected on the door reflecting zone to generate an apparent lighting from the door reflecting zone.

"Rear door" should be understood to mean any part of the body work of the vehicle which is able to close at least a part of the rear face of the vehicle. Typically, when the vehicle has a trunk, this rear door closes the trunk.

The mobile nature of the rear door makes the incorporation of light sources in that door difficult and costly. Here, a part of the trunk is lit without any light source having to be provided in the trunk by virtue of the reflection on the trunk reflecting zone.

These and other objects and advantages of the invention will be apparent from the following description, the accompanying drawings and the appended claims.

BRIEF DESCRIPTION OF THE ACCOMPANYING DRAWINGS

Other features and advantages of the invention will become apparent on studying the following detailed description, and the attached drawings in which.

DETAILED DESCRIPTION OF THE PREFERRED EMBODIMENTS

The invention is described herein below in its nonlimiting application to the rear or front signaling lights of a motor vehicle. Other applications, for example, to an interior lighting of a motor vehicle or even to decorative lighting devices (of "tuning" type for motor vehicle customization) for example for heavy trucks can also be envisaged. Some of these applications are also described herein below.

Figure 1:
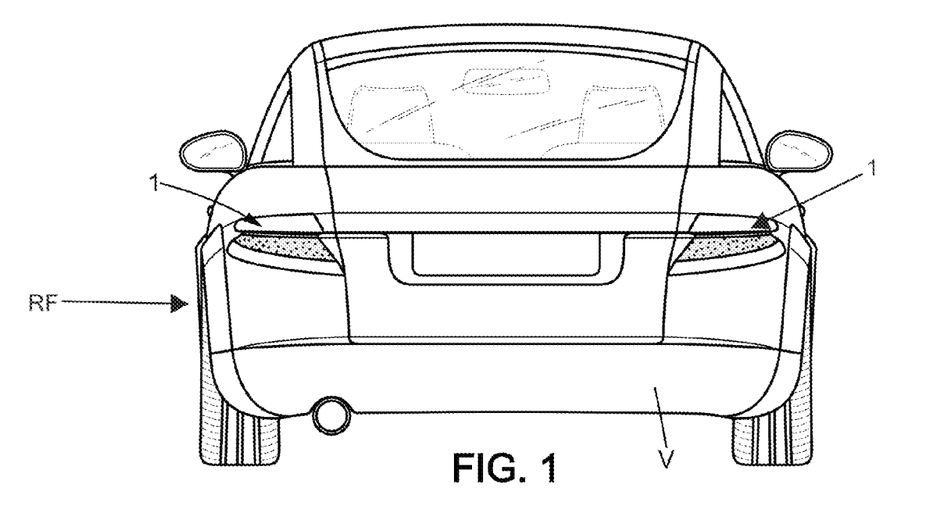
FIG. 1 illustrates a context of incorporation of a lighting device on a motor vehicle, according to one embodiment of the invention.

FIG. 1 illustrates a rear face RF of a motor vehicle V on which are arranged two lighting devices 1 within the meaning of the invention, one on the left of the rear face RF and one on the right of the rear face RF.

The lighting device 1 is here used as a rear signaling light for the vehicle V. This means that the function of this light is to signal the position of the vehicle V, typically when visibility conditions are reduced (driving at night or in rainy weather for example). This light can also have the function of signaling a change of direction (flashing lights), a braking action of the vehicle V (stop light) or even that the vehicle V proceeds to reverse (reversing lights). At the front, it is, for example, a position light or light of "daytime running lamp" type, DRL, which is on in the daytime.

In the particular case of the reversing lights, the function of these lights may be to warn that the vehicle is reversing, but also to allow the driver to see the rear environment when maneuvering in a dark environment.

The arrangement and the number of lighting devices can vary as a function of the vehicle category (utility vehicle or passenger vehicle for example), according to current regulations, etc.

Figure 2:
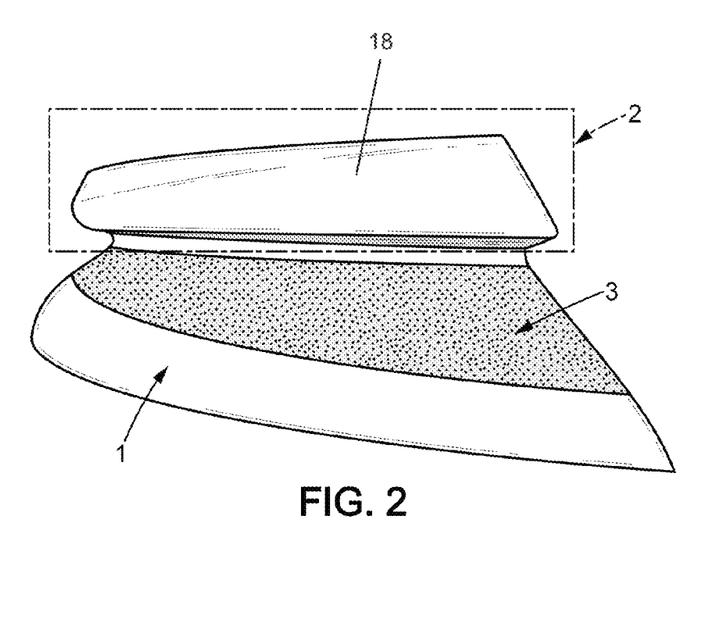
FIG. 2 is an overall view of a lighting device, according to one embodiment of the invention.

FIG. 2 gives a closer or enlarged view of the lighting device 1. As detailed herein below, the lighting device 1 comprises a casing 21 in which there is at least one light source.

In particular, FIG. 2 represents a wall 18 of the lighting device 1 intended to close or cover the casing 21 of the lighting device 1, and to be incorporated in the body work. The wall 18 forms the outer skin of the lighting device 1. In this example, the dimensions of the wall 18 correspond to the dimensions of the casing 21. As a variant, the wall 18 extends over a part of the body work by extending the casing 21 for the lighting surface to be more extensive. Thus, in FIG. 2, the wall is seen from the outside of the vehicle V.

The wall 18 forms a protuberance 2 here identified by a chain-dotted line frame. It is situated above a zone 3 of the wall 18 that reflects outward, i.e. that has outward reflection properties. The outward reflecting surface is here the outer surface of the wall 18.

However, the wall in the reflecting zone 3 can be a double wall in which an outer wall is translucent and protects an inner wall which has light reflection properties.

In the case of a single wall, the reflecting zone 3 can consist of a reflecting material, or of a material covered with a reflecting material, preferentially aluminum, for example in a thin layer, for example vacuum-deposited on the wall. The reflecting zone 3 can also consist of an overmolding of a reflecting film on the wall, or of a deposition of a reflecting ink by pad printing on the wall, etc. Preferably, it is a deposition of a reflecting material by screen-printing on a film overmolded on the wall. These processes can be performed on the outer surface or on the inner surface of the wall. In the case of a double wall, these processes are performed preferably on the outer surface or on the inner surface of the inner wall, or even on the inner surface of the outer wall.

As another variant, the material of the body of the wall 18 contains reflecting particles to form the reflecting zone 3. In this variant, the reflecting zone 3 therefore consists of the very body of the wall 18.

Figure 3A:
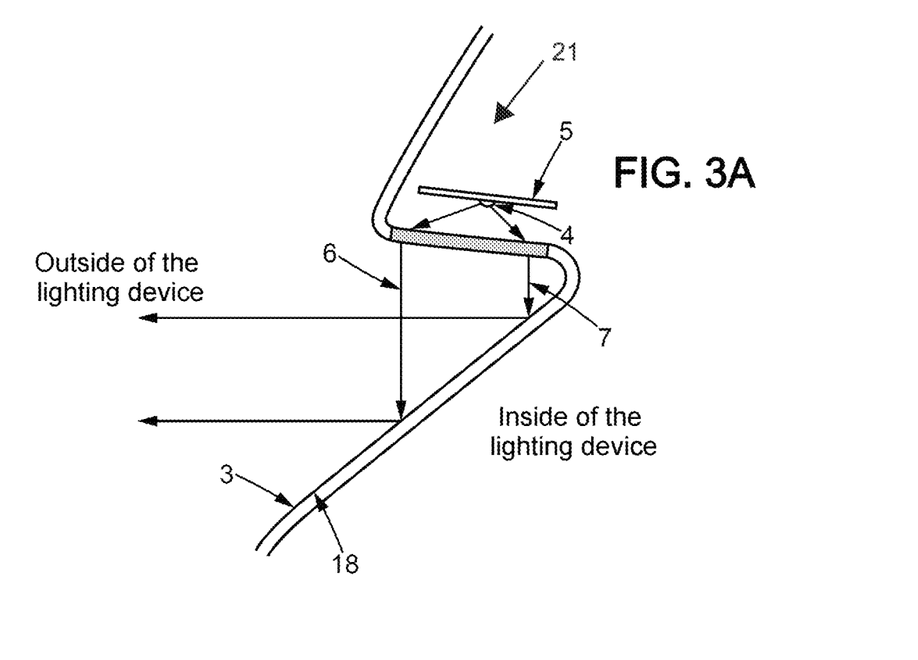
FIG. 3A is a first cross-sectional view of a lighting device, according to a first embodiment of the invention.
Figure 3B:
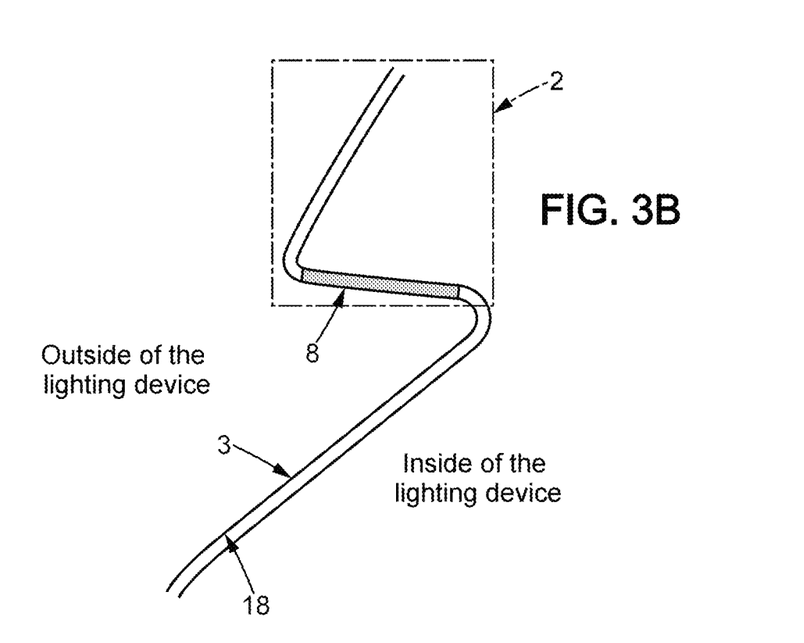
FIG. 3B is a second cross-sectional view of a lighting device, according to the first embodiment of the invention.

FIGS. 3A and 3B give a cross-sectional view of a part of the lighting device 1, in a first embodiment.

The wall 18 delimits a space internal to the lighting device 1 and a space external to the lighting device 1, as directly indicated in FIG. 3A. This wall 18 is typically manufactured by thermoforming, by injection molding or any other method for manufacturing parts in plastic material, or consisting of any type of suitable material. Inside the protuberance 2 there is a first light source comprising at least one light-emitting diode 4, for example mounted on a printed circuit 5. As a variant, the light-emitting diode 4 is mounted on a support of any other suitable type, for example a mounting of "submount" type on a heat sink. As another variant, the light source is of any other suitable type.

The wall 18 is, in a cross-sectional view, in the form of an S. This form makes it possible to easily incorporate the first light source in the wall (at the level of the protuberance 2) and to orient the light beams toward the reflecting zone 3. As a variant, the wall 18 can, also in a cross-sectional view, be in the form of a Z, for which the angles of the wall are more pronounced. Other variant forms can be envisaged, such as, for example, the form of an inverted S or Z for which the protuberance 2 would be situated below the reflecting zone 3 or any other suitable form.

The first light source can also comprise a collimator.

Between one and up to several tens of light-emitting diodes 4 can be provided. The light-emitting diode 4 can be of chromatic type (energy concentrated over a narrow wavelength range such as from 20 to 40 nm of bandwidth) or even of white type (the energy is distributed in the visible over at least a part of the range of wavelengths from 380 to 780 nm, for example using a phosphorescent material of phosphor type). The first light source can also comprise conventional electric lamps such as incandescent lamps, for example halogen.

The light beams generated by the light-emitting diode 4, for example, represented by arrows 6 and 7, are propagated briefly in the protuberance 2 before passing through a first light output surface 8, as illustrated in FIG. 3B, in which the corresponding zone of the protuberance 2 is framed. The interior of the protuberance 2 can comprise a set of mirrors in order to focus the light beams on the light output surface 8.

Preferably, the light output surface 8 comprises a material making the transmission of the light beams possible. The light output surface is for example produced by a light and transparent zone of the wall. Typically, this material is a transparent or translucent plastic such as polymethyl methacrylate. This material can also have diffraction or refraction properties in order, for example, to focus the light beams on the reflecting zone 3. Such a light output surface can be obtained by edge-to-edge molding with the rest of the wall or by overmolding.

The light output surface 8 can comprise different layers of different materials to make light effects possible.

Furthermore, prismatic or lenticular reliefs can also be provided in the material of the zone of the wall forming the light output surface 8.

After having passed through the light output surface 8, light beams 6 and 7 are reflected in the reflecting zone 3 of the wall 18. The reflecting zone 3 is formed facing the first light source. Thus, the light beams 6 and 7 generated by the first light source pass through a zone to the outside of the lighting device 1 and are reflected on the reflecting zone 3 of the wall 18 to generate an apparent lighting from the wall 18.

Figure 4A:
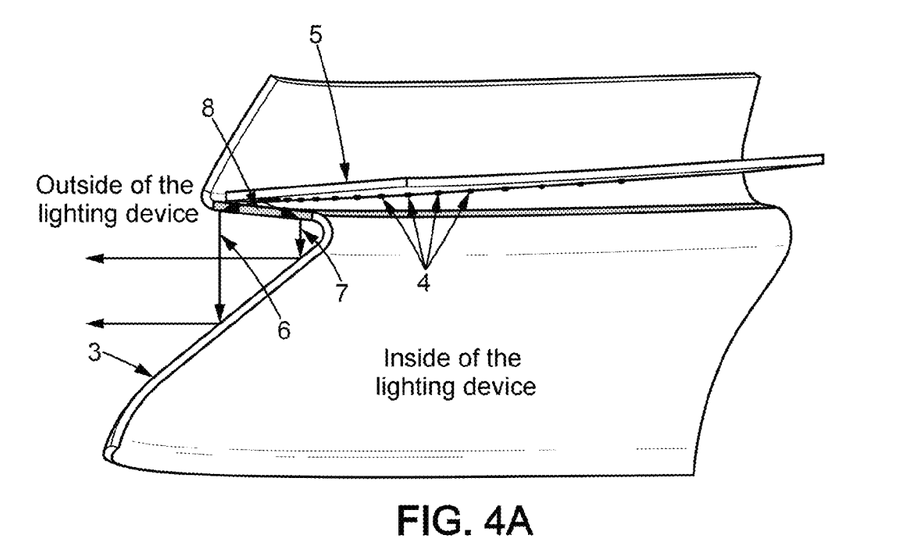
FIG. 4A illustrates a lighting device, according to the first embodiment of the invention.

FIG. 4A presents a perspective view of the inside of the lighting device 1, in the first embodiment. As presented in this figure, the form of the printed circuit 5, of the light output surface 8 and therefore of the wall 18 can be bent inward relative to a vertical axis of revolution.

Figure 4B:
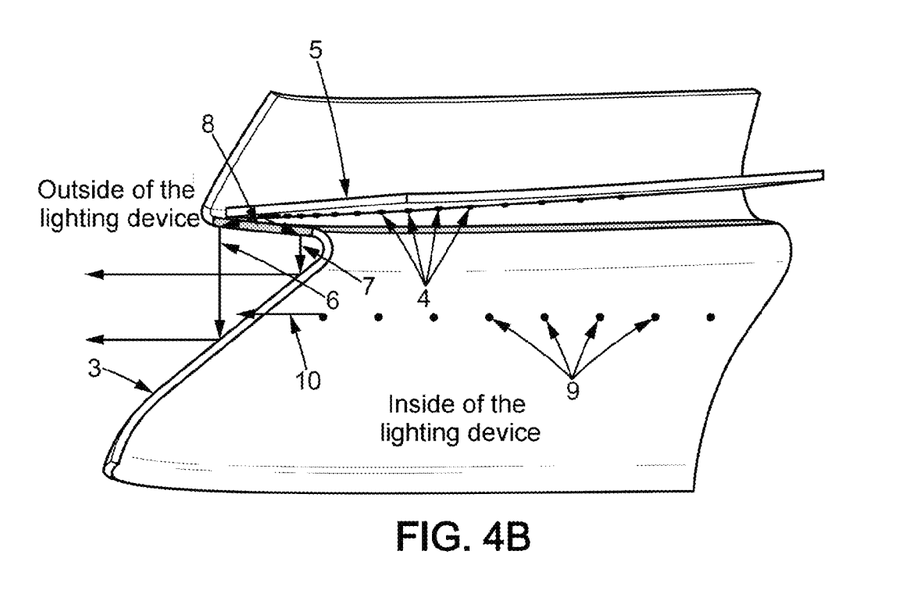
FIG. 4B illustrates a lighting device, according to a second embodiment of the invention.

FIG. 4B presents a perspective view of the inside of the lighting device 1 in a second embodiment.

In this second embodiment, the lighting device 1 also comprises at least one second light source 9 situated inside the lighting device 1, in the reflecting zone 3. A part of the reflecting zone 3 then also has light transmission properties such that a light beam 10 generated by the second light source 9 can pass through the wall 18 in the part of the reflecting zone 3.

In this second embodiment, the wall of the lighting device 1 is intended to close all of the casing 21 of the lighting device 1 in which the first light source and second light source 9 are contained.

"Second light source 9 situated in the interior space, in the reflecting zone 3" should be understood to mean that the second light source 9 is able to generate light beams directly projected onto the inner face of the reflecting zone 3 of the wall 18. As a variant, a set of one or more reflector(s) situated in the casing 21 of the lighting device 1 can be used for the beams projected onto the inner face of the wall 18 to originate indirectly from the first light source.

The second light source 9 can comprise the same elements as those described herein above for the first light source.

Figure 5:
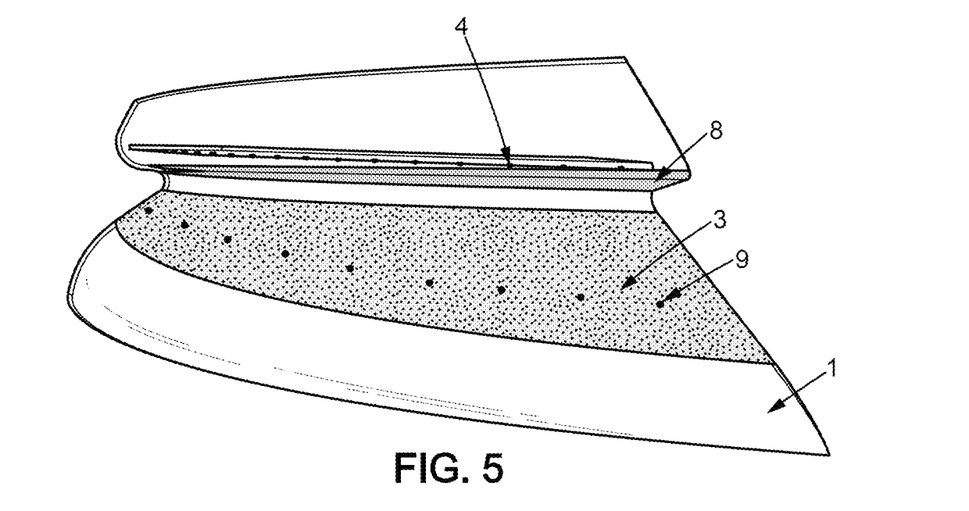
FIG. 5 is an overall view of a lighting device, according to the second embodiment of the invention.

FIG. 5 gives a closer view of the lighting device 1, according to the second embodiment. The second light sources 9 are here represented transparently but are indeed situated under the reflecting zone 3.

Figure 6:
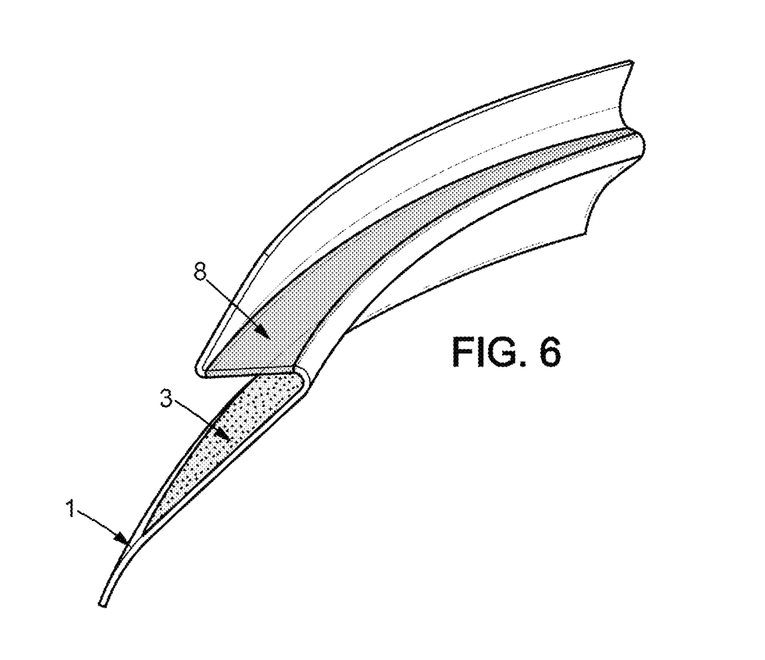
FIG. 6 is a perspective view of the wall of a lighting device, according to one embodiment of the invention.

FIG. 6 presents a perspective view of the wall 18 of the lighting device 1 of FIGS. 1 to 5.

Figure 7A:
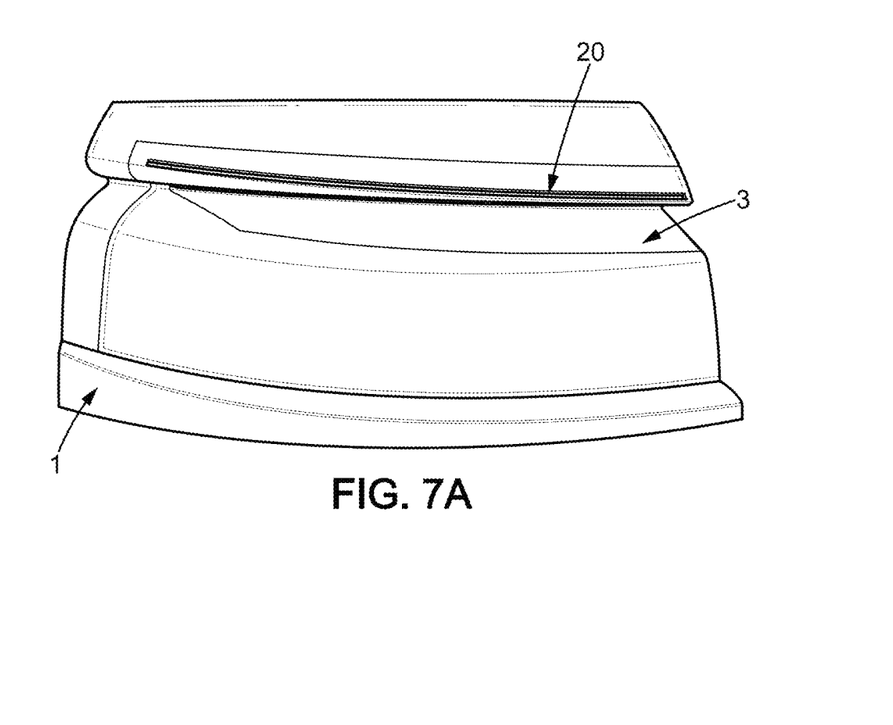
FIG. 7A presents a three-dimensional illustration of a lighting device, in an off state, according to the first embodiment of the invention.

FIG. 7A presents a three-dimensional illustration of the lighting device 1 in an off state. The lighting device 1 here comprises, in the protuberance 2, a second light output surface 20 formed for a light beam generated by the first light source and/or an auxiliary light source to be propagated directly toward the outside space without being reflected on the reflecting zone 3. The auxiliary light source can comprise the same elements as those described above for the first light source and second light source 9.

The second light output surface 20 can be filled by the same materials as those described above for the first light output surface 8.

Figure 7B:
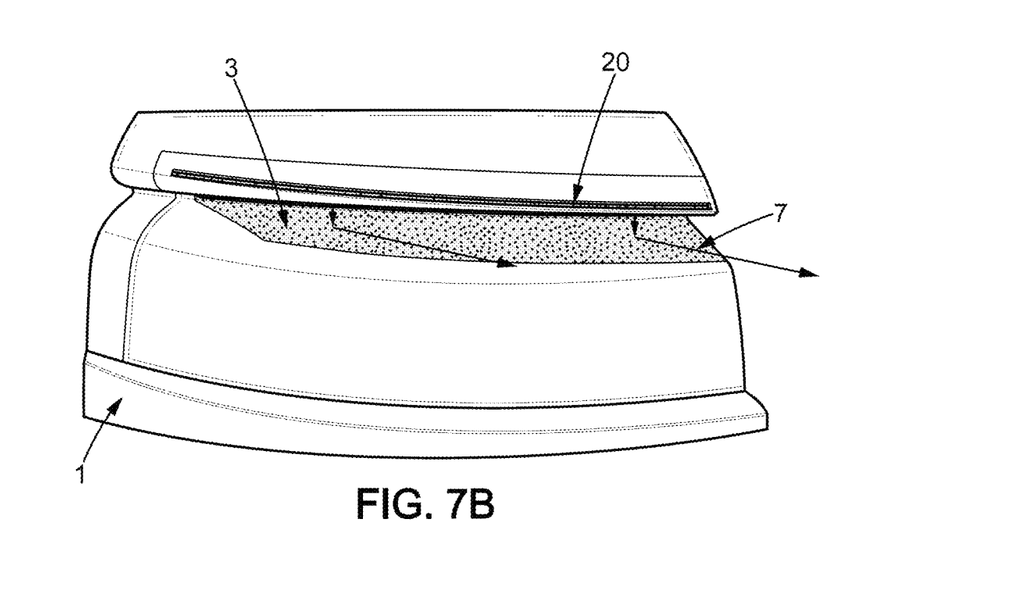
FIG. 7B illustrates the device of FIG. 7A, in an on state, according to the first embodiment of the invention.

FIG. 7B presents a three-dimensional illustration of the lighting device 1 in an on state. In this figure, the first light source generates light beams, like the light beam 7, which are reflected on the reflecting zone 3.

Figure 7C:
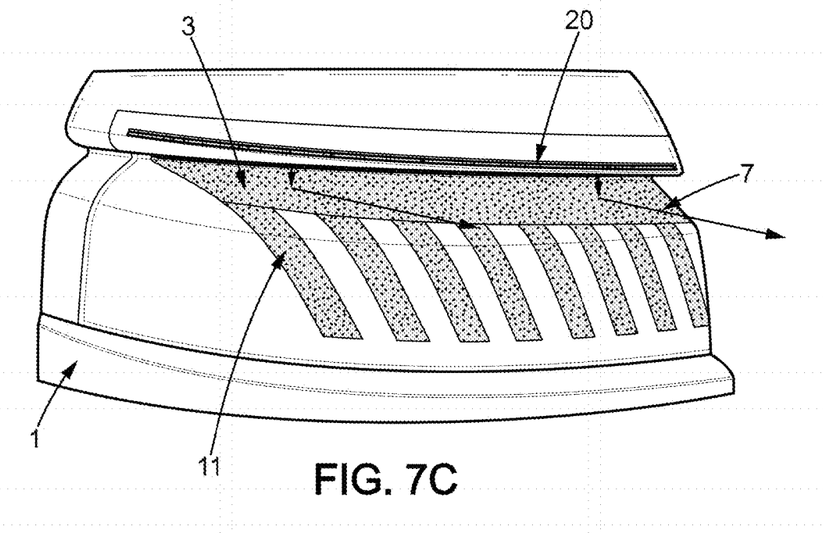
FIG. 7C presents a three-dimensional illustration of a lighting device, in an on state, according to another embodiment of the invention.

As a variant, as illustrated in FIG. 7C representing another exemplary lighting device 1, in an on state, the lighting device 1 comprises other light zones, such as the hatchings 11. These zones consist for example of a translucent material able to allow light beams generated by a light source situated inside the lighting device 1 to pass. This light source can be the second light source 9 mentioned above or a light source specifically provided for the hatchings 11.

Figure 8:
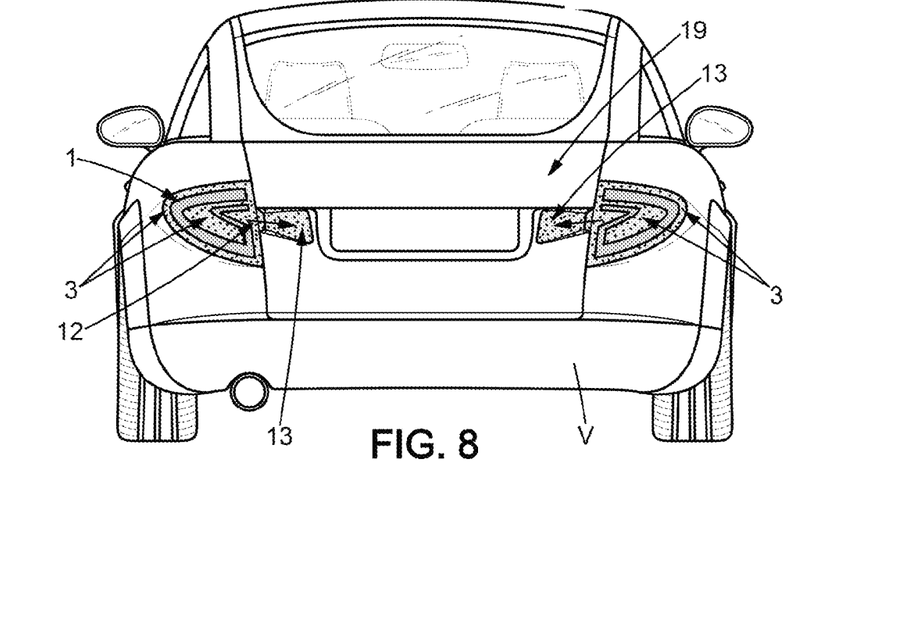
FIG. 8 illustrates a lighting device incorporated in the rear face of a vehicle, according to one embodiment of the invention.

FIG. 8 illustrates an example in which the lighting device 1 has a protuberance 2 in the general form of a G (for the left wing) and a reflecting zone 3 extending both around and inside the protuberance 2. This example shows the variety of forms possible both for the protuberance 2 and for the reflecting zone 3. Generally, the protuberance 2 of the wall 18 and the reflecting zone 3 have a form and a relative arrangement of any suitable type for producing an exterior lighting. Very many design possibilities are possible and can be envisaged.

The lighting device 1 illustrated in FIG. 8 also has another important feature, permitted by its G-shaped form without this form in any way being necessary, namely the lighting of a moving part of the body work, a trunk lid 19 in this example. The lighting device 1 and a reflecting zone 3 present on the trunk lid 19 are arranged for a light beam 12 to be generated by the first light source toward the surface 13. An apparent lighting from the trunk lid 19 is thus made possible without having to incorporate light sources in this trunk lid 19.

Figure 9A:
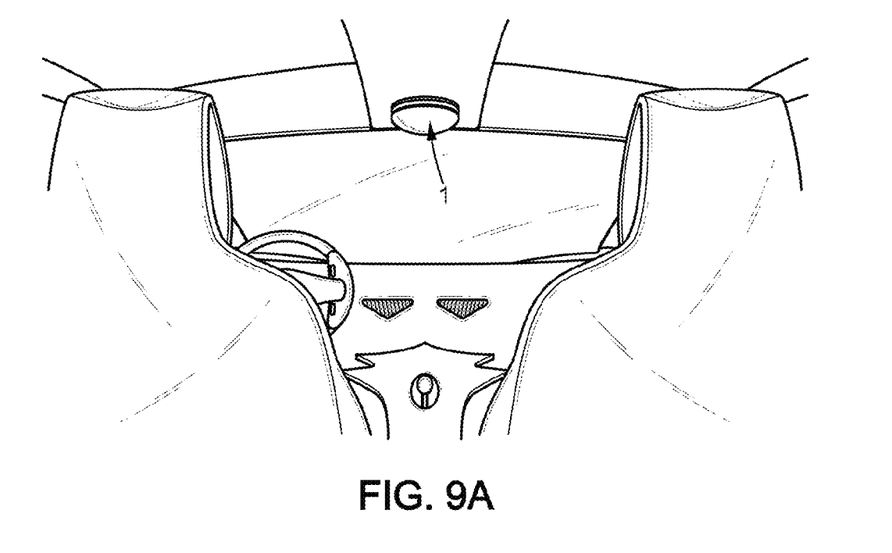
FIG. 9A illustrates a context of incorporation of a lighting device, according to one embodiment of the invention, for another application of the invention.
Figure 9B:
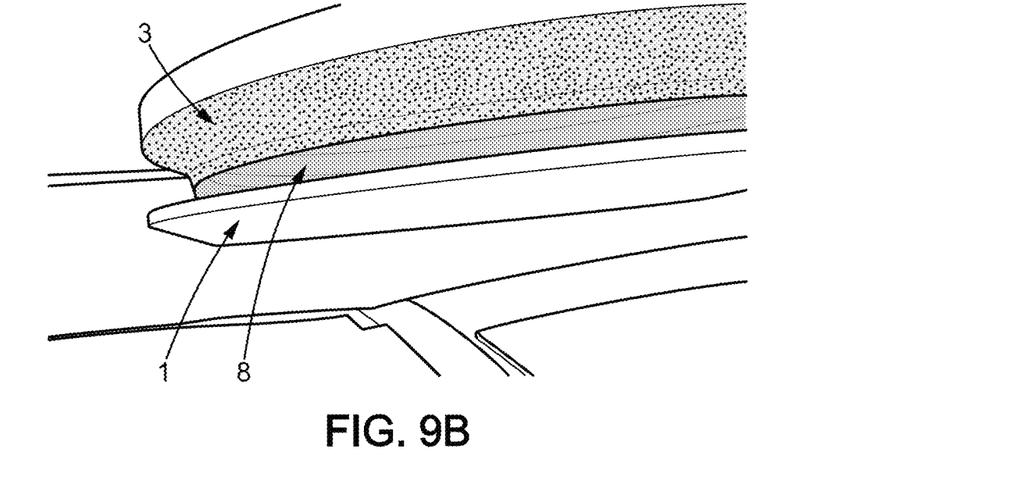
FIG. 9B is an overall view of a lighting device, according to one embodiment of the invention, for the other application of the invention.
Figure 9C:
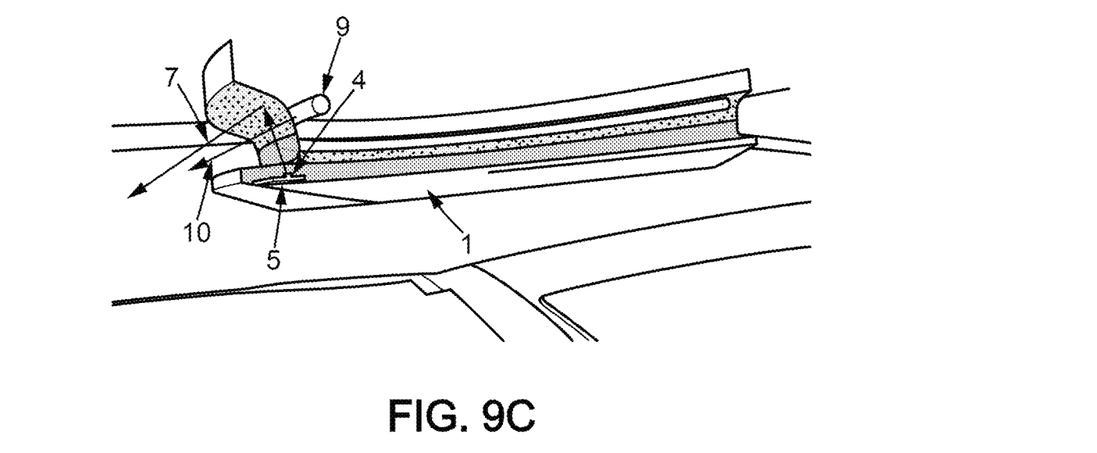
FIG. 9C illustrates the detail of a lighting device, according to one embodiment of the invention, for the other application of the invention.

FIGS. 9A, 9B and 9C illustrate another possible application of the present invention to an interior lighting of a motor vehicle V.

As FIG. 9A shows, the lighting device 1 here takes the form of a dome situated inside the motor vehicle V, on the roof and close to the windshield. The function of this dome is to light, whether in a diffuse manner or in a more pronounced manner (typically in reader mode), the interior of the vehicle V.

FIG. 9B shows the reflecting zone 3, here situated above the light output surface 8, from which the light beams generated by the first light source are transmitted. The protuberance is formed by the lower circular edge of the dome and the dome delimits, above the protuberance 2, an annular groove. The reflecting zone 3 is provided in the groove, directly above the protuberance 2, and thus forming a circular ring above the protuberance 2. As a variant, however, the lighting device 1 has a form of any suitable type, more particularly the protuberance 2 and the reflecting zone 3 have a form and an arrangement of any suitable type for producing a lighting by functional reflection for the user. For an interior lighting of dome type, advantageously, as illustrated, the reflecting zone 3 is directly above the protuberance 2.

FIG. 9C is a cross-sectional view illustrating the inside of the lighting device 1 and detailing its operation in this configuration for interior lighting hting.

The first light source comprises light-emitting diodes 4 from which light beams such as the light beam 7 are generated.

A second light source 9 is here formed by a circular light guide running along the inside of the reflecting zone, fed with light by one or more light-emitting diodes 4 arranged facing one or more light inputs of the guide. This second light source 9 generates light beams like the light beam 10 which is propagated from the inside to the outside of the lighting device 1 by passing through the reflecting zone 3. In effect, the reflecting zone 3 here has light reflection properties and light transmission properties.

The present invention is not limited to the embodiments described above by way of examples; it extends to other variants.

Thus, an embodiment is described above in which the lighting device has circular forms. The invention is not limited to such forms and extends to any form likely to implement the functions described in the claims.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A lighting device for a motor vehicle (V), comprising:
a wall comprising at least one protuberance; and
at least one first light source situated inside said at least one protuberance;
said wall comprises a reflecting zone located outside said lighting device, said reflecting zone having light reflection properties, and formed facing said at least one first light source, such that said at least one first light source is able to generate a light beam passing through said wall, that is propagated outside said lighting device before being reflected on said reflecting zone of said wall to generate an apparent lighting from said wall;

wherein said wall delimits a space internal to said lighting device and a space external to said lighting device,
said lighting device further comprising:
at least one second light source situated in said internal space in said reflecting zone having light reflection properties;
wherein at least a part of said reflecting zone having light reflection properties also has light transmission properties such that a light beam generated by said second light source can pass through said wall in said part of said reflecting zone.

2. The lighting device according to claim 1, wherein said reflecting zone has a reflection rate of at least 30%.

3. The lighting device according to claim 2, wherein said at least one first light source and/or said at least one second light source comprises at least one light-emitting diode.

4. The lighting device according to claim 2, wherein said wall is manufactured by injection molding.

5. The lighting device according to claim 2, wherein said at least one protuberance comprises a first light output surface formed facing said reflecting zone for said light beam generated by said at least one first light source to be reflected on said reflecting zone.

6. The lighting device according to claim 5, wherein said at least one protuberance further comprises a second light output surface formed for said light beam generated by said at least one first light source and/or an auxiliary light source situated in said at least one protuberance to be propagated directly toward the outside space without being reflected on said reflecting zone.

7. The lighting device according to claim 6, wherein said first light output surface and/or said second light output surface comprises a material having light transmission properties.

8. The lighting device according to claim 1, wherein said at least part of said reflecting zone also having said light transmission properties has a transmission rate of at least 30%.

9. The lighting device according to claim 8, said at least one first light source and/or said at least one second light source comprises at least one light-emitting diode.

10. The lighting device according to claim 8, wherein said wall is manufactured by injection molding.

11. The lighting device according to claim 1, wherein said at least one first light source and/or said at least one second light source comprises at least one light-emitting diode.

12. The lighting device according to claim 1, wherein said wall is manufactured by injection molding.

13. A signaling light for a motor vehicle, wherein it is formed by said lighting device according to claim 1.

14. The signaling light according to claim 13, situated on the rear face of said motor vehicle, said motor vehicle comprising a rear door,
wherein said rear door comprises a door reflecting zone having light reflection properties formed facing said at least one first light source and/or said at least one second light source, such that said at least one first light source and/or said at least one second light source is able to generate a light beam that is reflected on said reflecting zone of said rear door to generate an apparent lighting from said reflecting zone of said rear door.

* * * * *